United States Patent
Jobe

(10) Patent No.: US 11,453,540 B2
(45) Date of Patent: *Sep. 27, 2022

(54) RECYCLABLE INSERT FOR SHIPPING CONTAINER

(71) Applicant: Vericool World, LLC, San Ramon, CA (US)

(72) Inventor: Darrell Jobe, Pleasanton, CA (US)

(73) Assignee: Vericool World, LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,369

(22) Filed: Apr. 14, 2020

(65) Prior Publication Data
US 2020/0307895 A1  Oct. 1, 2020

Related U.S. Application Data

(63) Continuation of application No. 15/913,538, filed on Mar. 6, 2018, now Pat. No. 10,625,923, which is a
(Continued)

(51) Int. Cl.
*B65D 81/38* (2006.01)
*B65D 5/64* (2006.01)
(Continued)

(52) U.S. Cl.
CPC ........... *B65D 81/3813* (2013.01); *B65D 5/56* (2013.01); *B65D 5/64* (2013.01); *B65D 65/466* (2013.01);
(Continued)

(58) Field of Classification Search
CPC .............. B65D 81/3862; B65D 81/051; B65D 81/052; B65D 81/3816; B65D 81/3818;
(Continued)

(56) References Cited

U.S. PATENT DOCUMENTS

| 3,304,219 A | 2/1967 | Nickerson |
| 4,662,521 A | 5/1987 | Moretti |

(Continued)

FOREIGN PATENT DOCUMENTS

| CN | 86102000 | 12/1986 |
| CN | 1143740 | 2/1997 |

(Continued)

OTHER PUBLICATIONS

CN Office Action in Chinese Application No. 201780025619.X, dated Jul. 3, 2019, 28 pages (with English translation).
(Continued)

*Primary Examiner* — Shawn M Braden
(74) *Attorney, Agent, or Firm* — Fish & Richardson P.C.

(57) ABSTRACT

A thermal insulation article for placement in a shipping container to hold an item includes a thermally insulating pad shaped to be positioned in a cavity of a rectangular prism shipping container to be adjacent to and cover one or more of a floor, four side walls and cover of the container while leaving an interior space to receive the item. The thermally insulating pad includes a compostable panel that holds together as a single unit and is formed primarily of starch, the panel providing a rectangular plate dimensioned to substantially span whichever of the floor, plurality of side walls or cover that the rectangular plate is adjacent, and a compostable or recyclable water-proof polymer film forming a pocket and surrounding the panel with the panel slidable within the pocket.

16 Claims, 8 Drawing Sheets

Related U.S. Application Data continuation of application No. 15/419,892, filed on Jan. 30, 2017, now Pat. No. 9,957,098, which is a continuation-in-part of application No. 15/279,172, filed on Sep. 28, 2016, now Pat. No. 9,751,683, which is a continuation of application No. 15/094,787, filed on Apr. 8, 2016, now Pat. No. 9,550,618, which is a continuation-in-part of application No. 15/089,344, filed on Apr. 1, 2016, now abandoned.

(51) Int. Cl.
  *B65D 5/56* (2006.01)
  *B65D 65/46* (2006.01)

(52) U.S. Cl.
  CPC ..... *B65D 81/3848* (2013.01); *B65D 81/3862* (2013.01); *Y02W 90/10* (2015.05)

(58) Field of Classification Search
  CPC .......... B65D 81/382; B65D 2519/0086; B65D 81/03; B65D 81/127; B65D 65/466; B65D 81/3813; B65D 2519/00497; B65D 2519/00925; B65D 81/3823
  USPC .................................................. 206/523, 594
  See application file for complete search history.

(56) References Cited

U.S. PATENT DOCUMENTS

| | | | |
|---|---|---|---|
| 5,208,267 A | 5/1993 | Neumann et al. | |
| 5,564,570 A | 10/1996 | Jaszai | |
| 5,660,903 A | 8/1997 | Anderson | |
| 5,733,403 A | 3/1998 | Morley | |
| 5,885,682 A | 3/1999 | Tanimoto et al. | |
| 5,897,017 A | 4/1999 | Lantz | |
| 5,912,058 A | 6/1999 | Takahashi et al. | |
| 6,050,412 A | 4/2000 | Clough | |
| 6,257,764 B1 | 7/2001 | Lantz | |
| 6,283,296 B1 | 9/2001 | Newman | |
| 6,619,500 B1 | 9/2003 | Lantz | |
| 6,938,968 B2 * | 9/2005 | Tanimoto | B65D 81/18 312/406 |
| 7,870,992 B2 | 1/2011 | Schille et al. | |
| 8,557,367 B2 | 10/2013 | Netravali | |
| 8,617,684 B2 | 12/2013 | Nomura | |
| 8,763,811 B2 | 7/2014 | Lantz | |
| 8,763,886 B2 | 7/2014 | Hall | |
| 9,550,618 B1 | 1/2017 | Jobe | |
| 9,751,683 B1 | 9/2017 | Jobe | |
| 9,957,098 B2 | 5/2018 | Jobe | |
| 10,046,901 B1 | 8/2018 | Jobe | |
| 10,625,923 B2 | 4/2020 | Jobe | |
| 10,647,497 B2 | 5/2020 | Jobe | |
| 2003/0082357 A1 | 5/2003 | Gokay | |
| 2004/0058119 A1 | 3/2004 | Wynne | |
| 2007/0051782 A1 * | 3/2007 | Lantz | B65D 81/05 229/103.11 |
| 2008/0289302 A1 | 11/2008 | Vulpitta | |
| 2009/0001086 A1 | 1/2009 | Roderick et al. | |
| 2010/0314397 A1 | 12/2010 | Williams | |
| 2011/0248038 A1 | 10/2011 | Mayer | |
| 2011/0259895 A1 | 10/2011 | Parenteau et al. | |
| 2012/0070609 A1 | 3/2012 | Poppe | |
| 2012/0097067 A1 | 4/2012 | Fascio | |
| 2012/0104009 A1 * | 5/2012 | Fascio | B65D 81/03 220/694 |
| 2012/0279896 A1 | 11/2012 | Lantz | |
| 2012/0312814 A1 | 12/2012 | Tolibas-Spurlock | |
| 2014/0319018 A1 | 10/2014 | Collison | |
| 2016/0052692 A1 | 2/2016 | Branham | |
| 2016/0194135 A1 | 7/2016 | Baker | |
| 2017/0283157 A1 | 10/2017 | Jobe | |
| 2018/0086538 A1 | 3/2018 | Jobe | |
| 2018/0194534 A1 | 7/2018 | Jobe et al. | |
| 2018/0327171 A1 | 11/2018 | Waitermire | |
| 2018/0339838 A1 | 11/2018 | Hall | |
| 2019/0367208 A1 | 12/2019 | Jobe | |
| 2019/0367209 A1 | 12/2019 | Jobe | |
| 2020/0407147 A1 | 12/2020 | Jobe | |

FOREIGN PATENT DOCUMENTS

| | | |
|---|---|---|
| CN | 204323860 | 5/2015 |
| EP | 2000422 | 5/2012 |
| JP | 2006/062691 | 3/2006 |
| JP | 2010/143617 | 7/2010 |
| JP | 2013/238305 | 11/2013 |
| WO | WO 99/32374 | 7/1999 |
| WO | WO 2006/117801 | 11/2006 |

OTHER PUBLICATIONS

CN Office Action in Chinese Application No. 201780025619.X, dated May 7, 2020, 12 pages (with English translation).
U.S. Appl. No. 15/089,344, Jobe, filed Apr. 1, 2016.
Extended European Search Report in European Appln No. 17776075.8, dated Mar. 8, 2019, 8 pages.
International Search Report and Written Opinion in International Patent Application No. PCT/US2017/015893, filed Jan. 31, 2017. dated May 19, 2017. 21 pages.
EP Office Action in European Appln No. 17776075.8, dated Jan. 16, 2020, 4 pages.
Office Action in Japanese Appln. No. 2019-503196, dated Oct. 19, 2021, 6 pages (with English translation).

* cited by examiner

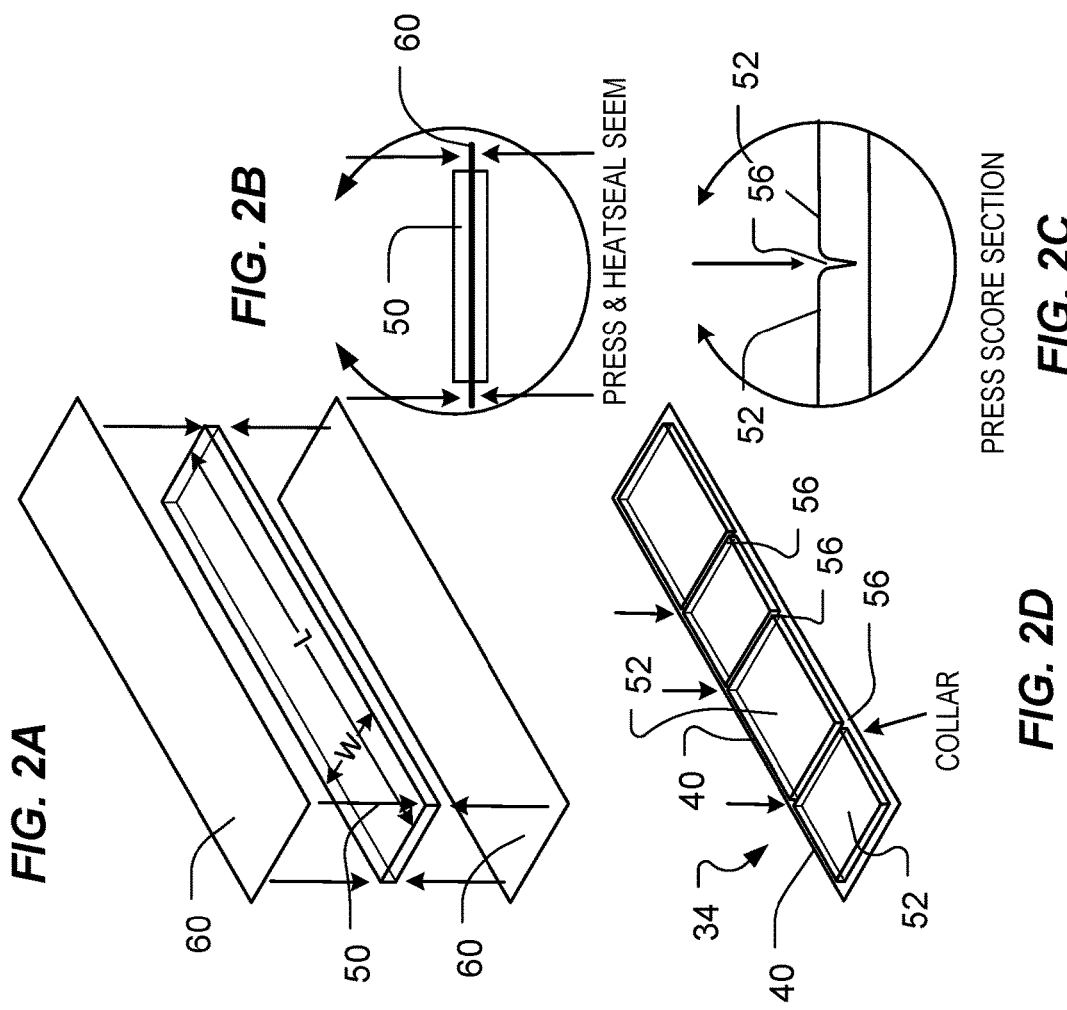

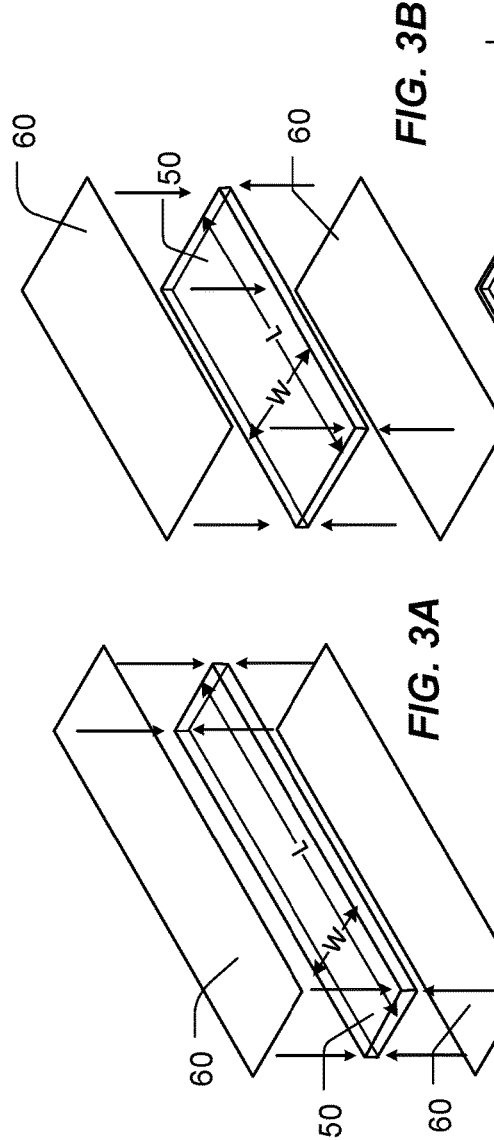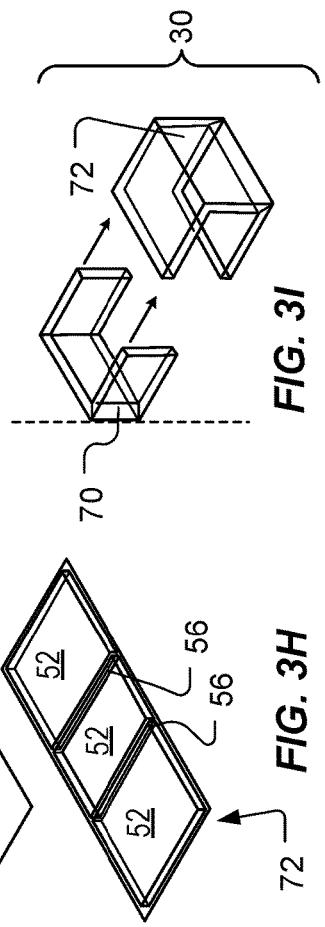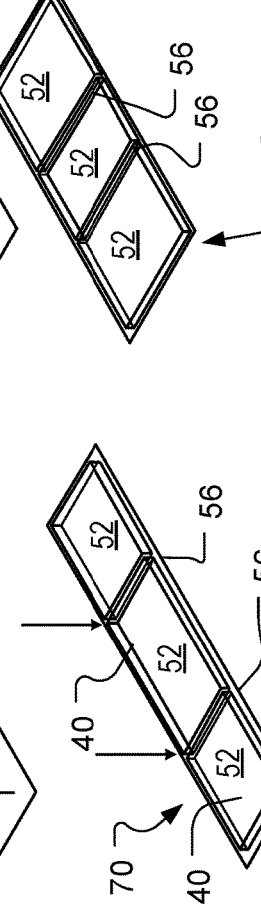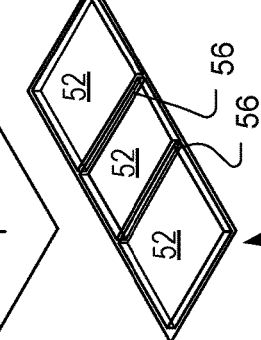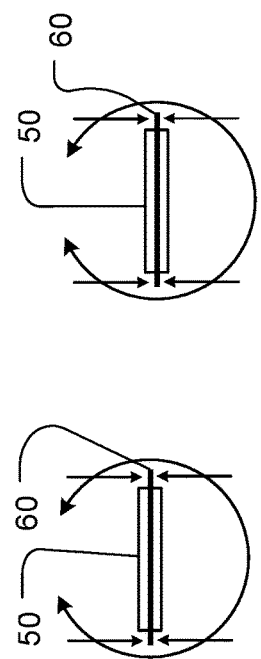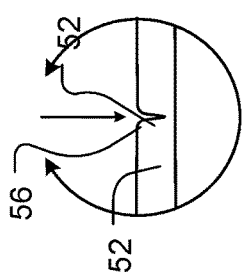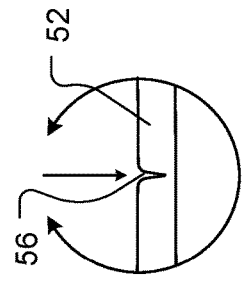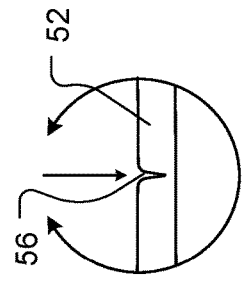

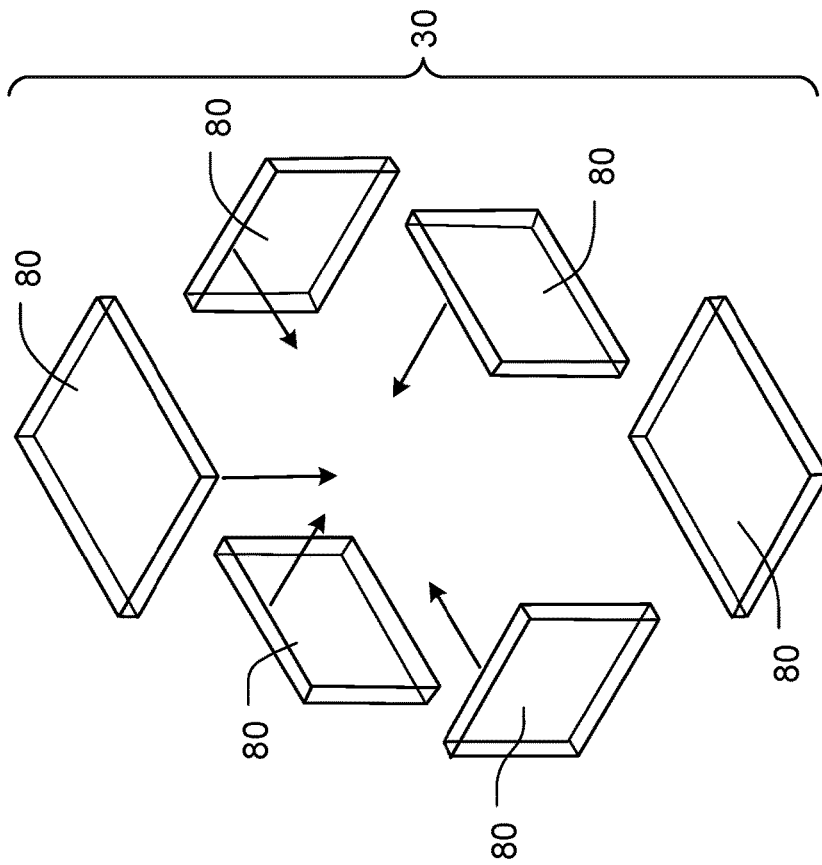
FIG. 4D
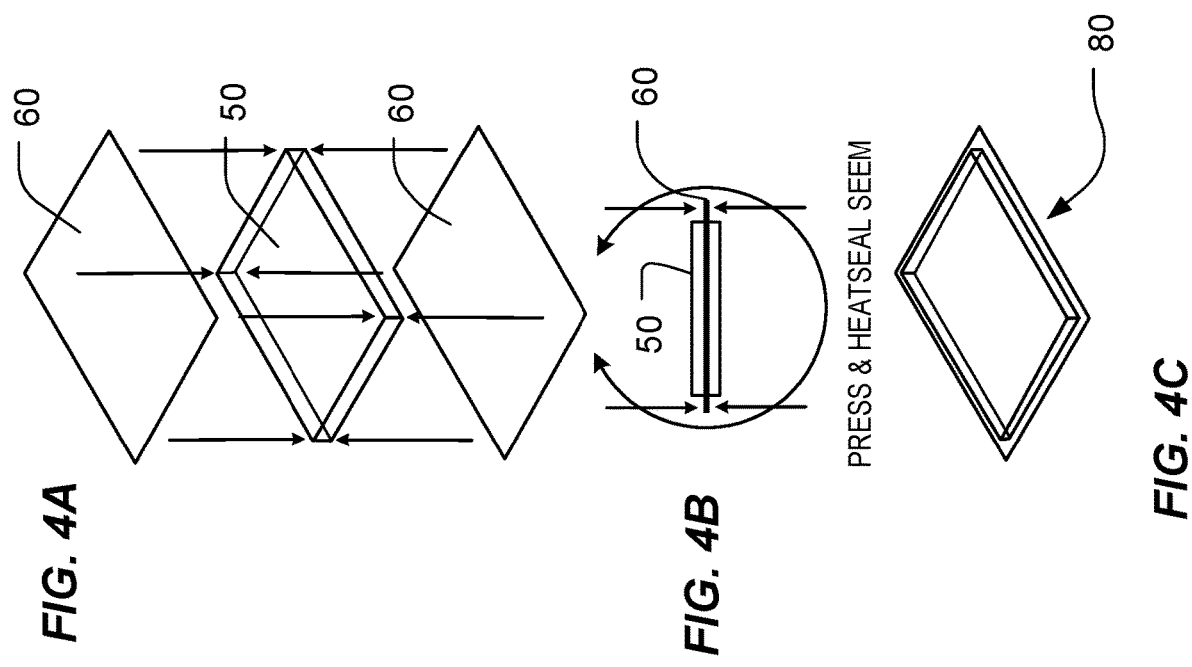
FIG. 4A
FIG. 4B
FIG. 4C

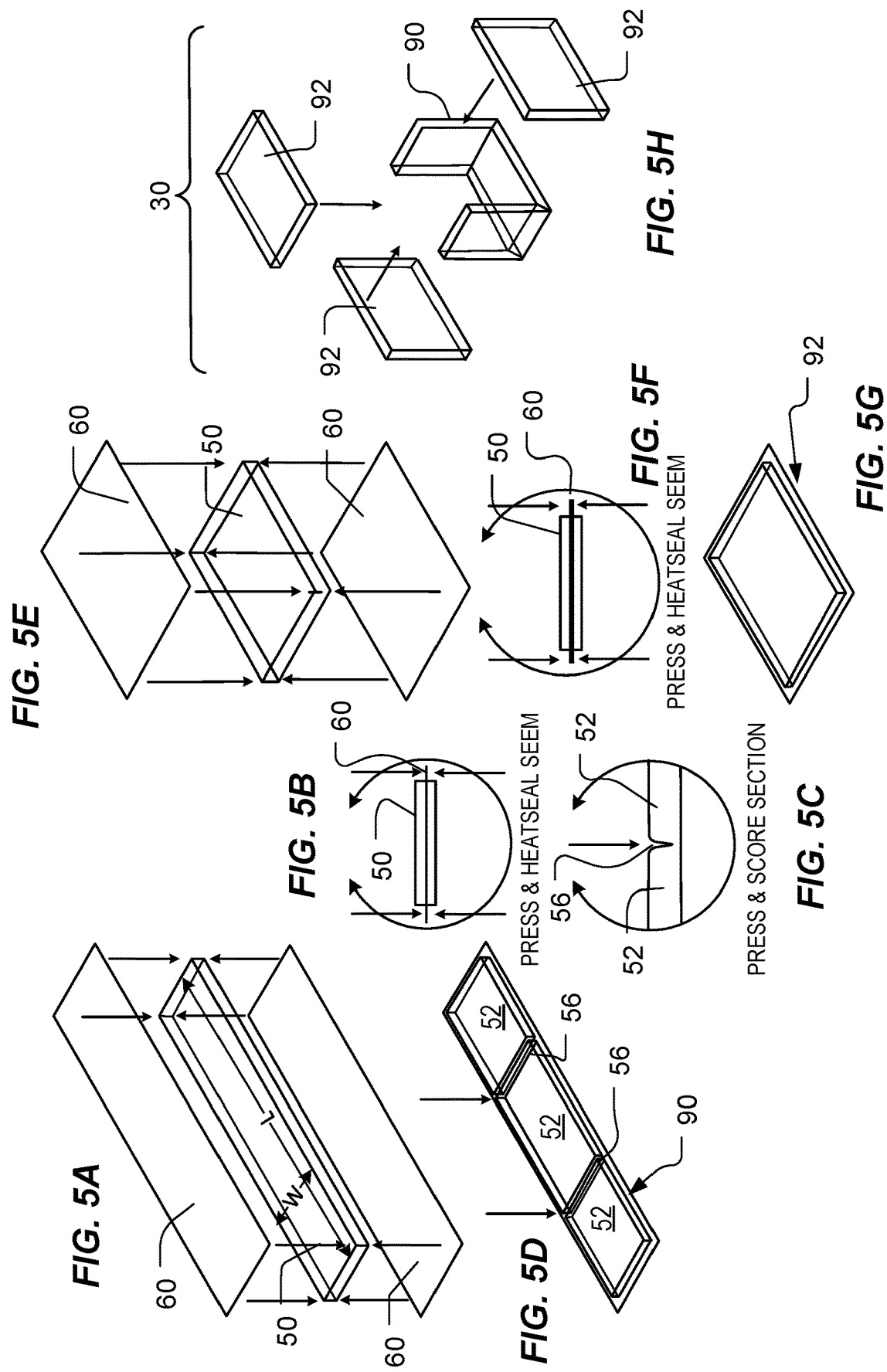

RECYCLABLE INSERT FOR SHIPPING CONTAINER

CROSS-REFERENCE TO RELATED APPLICATIONS

This application is a continuation of U.S. application Ser. No. 15/913,538, filed Mar. 6, 2018, which is a continuation of U.S. application Ser. No. 15/419,892, filed Jan. 30, 2017, which is a continuation-in-part of U.S. application Ser. No. 15/279,172, filed on Sep. 28, 2016, which is a continuation of U.S. application Ser. No. 15/094,787, filed Apr. 8, 2016, which is a continuation-in-part of U.S. application Ser. No. 15/089,344, filed on Apr. 1, 2016, each of which is incorporated by reference in its entirety.

TECHNICAL FIELD

This invention relates to an insulated shipping container, and more particularly to a shipping container in which the insulating material is compostable.

BACKGROUND

A conventional container for shipping temperature sensitive products includes a cardboard box, inside of which is a thermally insulating material. A conventional thermally insulating material is expanded polystyrene (EPS), e.g., Styrofoam. For example, panels of the expanded polystyrene can line the walls of the box, and another packing material, e.g., bubble wrap, can be placed surround and cushion the item being shipped inside the panels. Alternatively, expanded polystyrene can be machined or molded to form a "cooler" into which the item being shipped can be placed—this does not need an external box. In either case, a coolant, e.g., ice, dry ice or a gel pack, is placed in the cavity in the box with the item being shipped.

EPS is relatively inexpensive and easily formed into a variety of shapes, but is not compostable. Consequently, disposing of the material of the container can be a problem.

SUMMARY

A container is described that provides for thermal insulation of an item being shipped while the components are still recyclable or compostable.

In one aspect, a thermal insulation assembly for placement in a shipping container to hold an item includes a plurality of thermally insulating pads shaped to be positioned in a cavity of a rectangular prism shipping container such that each of a floor, plurality of side walls and cover of the container are adjacent to and covered by a pad from the plurality of thermally insulating pads and an interior space is provided to receive the item. Each pad of the plurality of thermally insulating pads includes a solid compostable panel formed primarily of grain starch that holds together as a single unit, and a water-proof polyethylene film forming a pocket enclosing the panel. The panel provides a rectangular plate dimensioned to substantially span whichever of the floor, plurality of side walls or cover that the rectangular plate is adjacent.

At least one of the plurality of thermally insulating pads is a multi-section pad including a plurality of rectangular panel sections enclosed by the film. The multi-section pad is configured to be foldable at a right angle along a boundary between the panel sections and each panel section is dimensioned to substantially span whichever of the floor, plurality of side walls or cover that the plurality of rectangular panel sections is adjacent. The film provides both an interior surface of the multi-section pad and an exterior surface of the multi-section pad where the pad is folded.

Implementations may include one or more of the following features.

An interior of the pocket may be evacuated of air. The panel may be slidable within the pocket. The polyethylene film may be affixed on at least one of an interior surface or exterior surface of the panel by an adhesive.

The at least one of the plurality of thermally insulating pads may include a score across its width in at least one location on an interior surface of the panel, the score extending partially but not entirely through the thickness of the multi-section panel to divide the panel into the plurality of rectangular panel sections. The score may be a compressed portion or a cut out portion of the multi-section body.

The starch may be a grain starch, a root starch, a vegetable starch, or combinations thereof. The panel of each pad may have a uniform homogenous composition. The plurality of rectangular panel sections may be part of a single unitary body.

In another aspect, a thermal insulation article for placement in a shipping container to hold an item includes a multi-section thermally insulating pad shaped to be positioned in a cavity of a rectangular prism shipping container to be adjacent to and cover from two to five out of a floor, four side walls and cover of the container while leaving an interior space to receive the item. The thermally insulating pad includes a plurality of solid compostable panel sections formed primarily of grain starch, and a water-proof polyethylene film forming a pocket enclosing the plurality of panel sections. Each panel section holds together as a single unit, and each panel section provides a rectangular plate dimensioned to substantially span whichever of the floor, plurality of side walls or cover that the rectangular plate is adjacent.

The multi-section thermally insulating pad is configured to be foldable at a right angle along a boundary between the panel sections. The film covers both an interior surface of the multi-section thermally insulating pad and an exterior surface of the multi-section thermally insulating pad where the multi-section thermally insulating pad is folded.

Implementations may include one or more of the following features.

An interior of the pocket may be evacuated of air. The plurality of solid compostable panel sections may be slidable within the pocket. The polyethylene film may be affixed by an adhesive on at least one of an interior surface or exterior surface of one or more of the panel sections.

The plurality of solid compostable panel sections may be part of a single unitary body. The unitary body may be a panel having a score across its width in at least one location on an interior surface of the panel, the score extending partially but not entirely through the thickness of the panel to divide the panel into the plurality of panel sections. The multi-section thermally insulating pad may include a plurality of stacked panels.

The plurality of solid compostable panel sections may each have a thickness between of about ¼ and 1 inch. Each of the plurality of solid compostable panel sections may be basically flat. One or more surfaces of one or more of the plurality of solid compostable panel sections may be corrugated. The starch may be a grain starch, a root starch, a vegetable starch, or combinations thereof.

In another aspect, a shipping container to hold an item includes an exterior box having a floor and a plurality of side walls to define a cavity therein and an opening to the cavity at the top of the box, a cover to close off the top of the box, and a plurality of thermally insulating pads positioned in the cavity, the plurality of thermally insulating pads positioned such that each of the floor, plurality of side walls and cover are adjacent to and covered by a pad from the plurality of thermally insulating pads, the plurality of thermally insulating pads shaped to provide an interior space to receive the item.

Each pad of the plurality of thermally insulating pads includes a solid compostable panel formed primarily of a starch that holds together as a single unit, and a water-proof polyethylene film forming a pocket enclosing the panel. The panel provides a rectangular plate dimensioned to substantially span whichever of the floor, plurality of side walls or cover that the rectangular plate is adjacent.

At least one of the plurality of thermally insulating pads includes a plurality of rectangular panel sections. The pad is folded at a right angle along a boundary between the panel sections and each panel section is dimensioned to substantially span whichever of the floor, plurality of side walls or cover that the plurality of plates is adjacent. The film provides both an interior surface of the pad and an exterior surface of the pad where the pad is folded.

Potential advantages may include (and are not limited to) one or more of the following.

The insulating material is compostable, and the exterior box is recyclable, so all of the components of the container are easily disposable. The film containing the insulating material is compostable or recyclable, and also easily disposed. The container can be easily assembled, and the insulating pads that fit inside the container can be manufactured at low cost. The insulating pads can provide equivalent thermal insulation to expanded polystyrene, and can be disposed in commercial and residential composting or recycling bins or garbage cans. The container components can be shipped in bulk in an unassembled state with minimal cost increase, and assembly of the container can be performed by the user.

The details of one or more embodiments are set forth in the accompanying drawings and the description below. Other features, objects, and advantages of the invention will be apparent from the description and drawings, and from the claims.

DESCRIPTION OF DRAWINGS

FIGS. 2A-2G illustrate an example of construction of the pads of the insulating shipping container of FIG. 1.

FIGS. 3A-3I illustrate an example that includes two three-sectioned pads for the insulating shipping container.

FIGS. 4A-4D illustrate an example that includes six individual pads for the insulating shipping container.

FIGS. 5A-5H illustrate an example that includes a three-sectioned pad and three individual pads for the insulating shipping container.

Like reference symbols in the various drawings indicate like elements.

DETAILED DESCRIPTION

Initially, some terminology may be beneficial. "Biodegradable" simply means that a product will eventually disintegrate into to innocuous material. "Recyclable" indicates that a product can be reused or treated in order to be made suitable for reuse. "Compostable" indicates both that a product will decompose quickly, e.g., within 180 days, and that the product will decompose into material that can be used as fertilizer (e.g., per ASTM D6400 or EN 13432). Products that are "biodegradable" need not be (and usually aren't) "compostable." First, since there is no particular time limit for a "biodegradable" product to disintegrate, it need not decompose quickly. For example, even aluminum cans will biodegrade given several centuries. Moreover, even a biodegradable product that decomposes quickly might not provide a material that is suitable as fertilizer.

Most conventional thermally insulating materials for packaging, e.g., EPS, are not compostable. One technique for using a compostable insulating packaging material is to fill a volume between an inner wall and an outer wall of a box with loose-fill compostable cornstarch foam pellets (e.g., packing "peanuts") using layered stratification, and then compress each layer of foam pellets in within this volume to compact them. This technique requires either multiple boxes or a specialized box having both inner and outer walls, and also requires specialized machinery for layered stratification compaction of the pellets. The additional or specialized boxes increase the cost. In addition, the loose fill pellets are difficult to compost because they are messy when removed from the box. Moreover, a large amount of pressure, e.g., 25 lbs. or more, needs to be applied to close the top flaps of the box due to the resistance from the pellets.

However, instead of loose-fill foam pellets, a solid compostable panel formed primarily of extruded starch, e.g., milled extruded sorghum, can be enclosed by a biodegradable or compostable water-proof film to provide a thermally insulating pad, and this pad can be used as the insulating packaging in the container.

Figure 1:
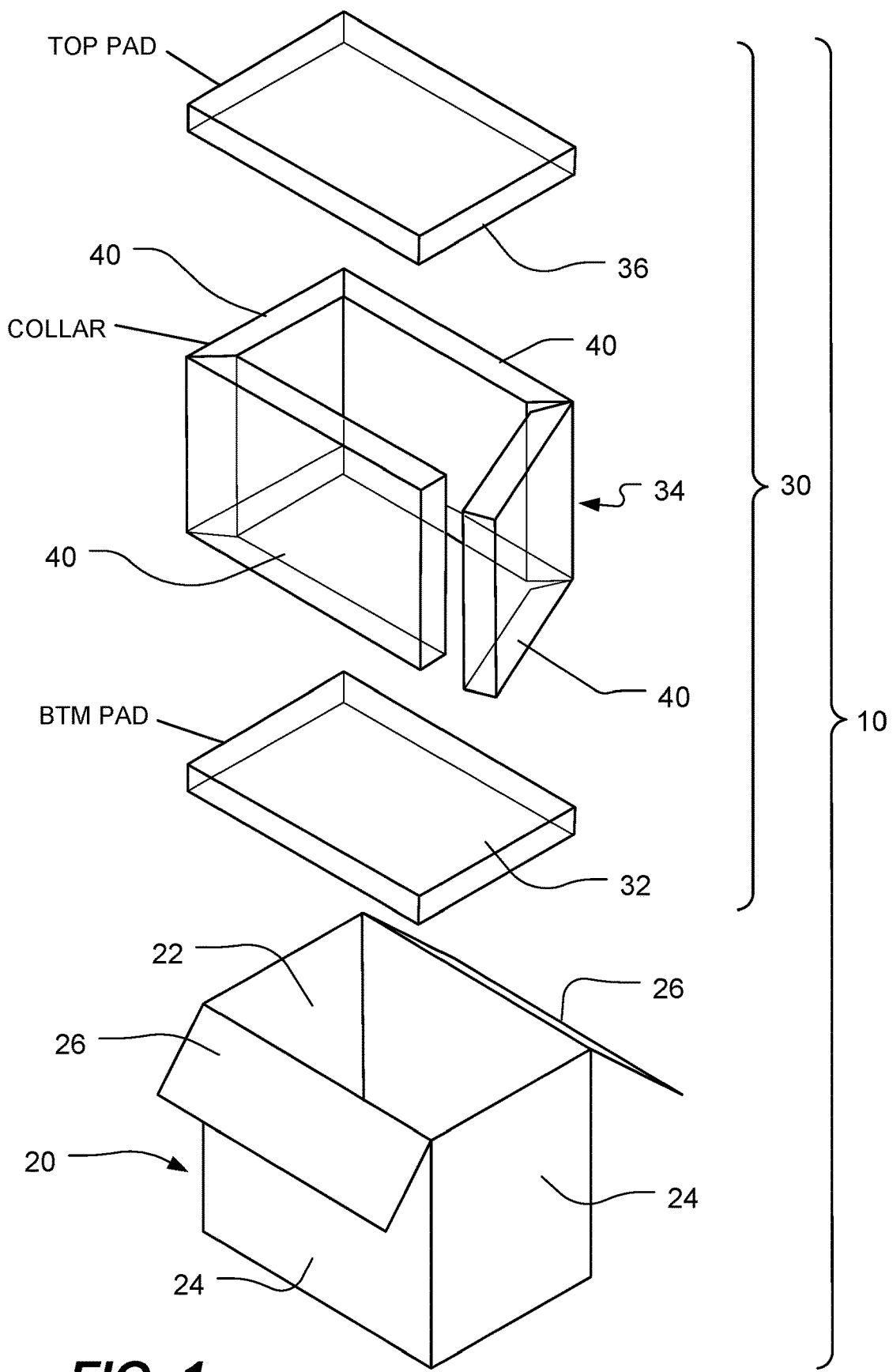
FIG. 1 is an exploded perspective view of an example of an insulated shipping container.

FIG. 1 is an exploded perspective view of an example of an insulated shipping container 10. The shipping container 10 includes a box 20 and multiple thermally insulating pads 30 that fit inside an interior cavity 22 of the box 20. The thermally insulating pads 30 are shaped such that when positioned in the box 20 they provide an interior space to receive the item and optionally a coolant, e.g., ice, dry ice or a gel pack.

The box 20 can be a rectangular prism, and can includes rectangular side walls 24 that define the interior cavity 22. The bottom of the box may similarly be closed off by one or more flaps (not shown due to the perspective view). The top of the box 20 provides an opening to the interior cavity 22. A cover for the box 20 can be provided by one or more flaps 26 that can be folded inwardly from the side walls 24 to close off the top of the cavity 22. In some implementations, the side walls 24, flaps 26 and bottom of the box are all part of a single integral sheet that is folded into an appropriate shape. Alternatively, the cover for the box 20 can be provided by a separate lid that fits over the side walls 24.

The box 20 is a recyclable material. For example, the box 20 can be a cardboard box, e.g., paper board or corrugated cardboard.

As noted above, the container includes multiple thermally insulating pads 30 that fit inside the box 20. Each pad 30 is formed by sealing a solid compostable panel (or multiple solid compostable panels) within a recyclable and biodegradable or compostable water-proof film. In some implementations, the pad includes a single panel. Each pad 30 is relatively thin, e.g., about 0.25-4 inch thick, as compared to the length and width of the pad. The thickness of a pad 30 is considered to be along its narrowest dimension, whereas the length and width of the pad 30 are considered to be along the two directions along the primary face, perpendicular to the thickness.

Each panel can be formed primarily of starch, e.g., an extruded starch. The starch can be a grain starch, e.g., corn starch, wheat starch or sorghum (sorghum is also known as milo), a root starch, e.g., potato starch, a vegetable starch, or combinations thereof. Other materials that do not interfere with the compostable nature of the panel, e.g., a softener to improve adhesion of the starch, or a preservative or anti-fungal agent, can be present, but only in small quantities. For example, at least 85%, e.g., at least 90-95%, by weight of the panel is starch. Polyvinyl alcohol can be present, e.g., 5-10% by weight.

Each panel is "solid", which in this context indicates that the panel holds together as a single unit, rather than being formed of loose-fill pellets. It may be noted that compressed starch pellets would not form a solid part; upon removal of pressure the pellets would disassemble, and increased pressure only fractures or pulverizes the pellets. A solid panel of extruded starch provides significant thermal insulation, while still being compostable.

It is possible for the panels to be a foam material, e.g., to include small pores or voids spread substantially uniformly through the panel. For example, 10-80% of the volume of the panel can be pores or voids, e.g., 25-75%, 25-50%, 10-25%, 50-75%. The maximum size of the pores or voids can be about 1 mm. Although the panel could be a foam material, it is generally incompressible. The density of a panel can be about 0.4-3.5 g/cm$^3$, e.g., 0.6-1.0 g/cm$^3$, 0.8-2.0 g/cm$^3$, 1.0-3.5 g/cm$^3$.

Each panel can be of a uniform homogenous composition. Furthermore, each panel can be a unitary body—that is the body of the panel holds together by itself without adhesives or fasteners to join multiple sections together to form the panel.

The thickness of a panel can be about 0.25-1.0 inches, e.g., 0.25-0.75 inches. Any given panel can have substantially uniform thickness across its primary surface. The surfaces of the panel can be generally flat, or one or more surfaces can be corrugated. Corrugation can increase the effective thickness of the pad, e.g., by a factor of up to 4. In this case, the thickness of the panel can still be uniform, but the panel is shaped with corrugations.

Each panel can include one or more rectangular plates dimensioned to substantially span whichever of the floor, plurality of side walls or cover that the rectangular plate is adjacent. In some implementations, the whole of the panel, when in an unfolded configuration, is also rectangular.

The panels can be formed by an extrusion process. After extrusion, each panel can be cut to the appropriate size. In addition, the edges can optionally be beveled as to provide the beveling of the pads described above. In addition, the panel that provides the collar can be scored, as described below.

The water-proof film can be a plastic film. In some implementations, the film is air-tight.

In some implementations, the water-proof film is compostable, e.g., a bioplastic that meets ASTM D6400 standards. Suitable materials for a compostable film include polymers based on one or more of polylactic acid (PLA), poly(beta-amino) esters (PBAE), polyhydroxyalkanoate (PHA), polycapralactones (PCL), polybutyrate adipate terephthalate (PBAT) polyvinylalcohol (PVA), or ethylene vinyl alcohol (EVOH). For example, a combination of PBAT and PE may be suitable. As another example, a combination of PE and PLA may be suitable. In some implementations, the polymer can be mixed with an organic product, e.g., a starch, such as corn starch.

In some implementations, the water-proof film is recyclable and biodegradable. A suitable material for the recyclable film is polyethylene. For example, the film can be a low-density polyethylene (LDPE), a medium-density polyethylene (MDPE) or a high-density polyethylene (HDPE). An advantage of polyethylene is ease of fabrication and good water resistance.

A problem with starch-based insulation is that it dissolves easily in water. If the item being shipped is cold or a coolant is placed in the interior of the container 10, condensation can form on the interior surfaces of the pad 30. However, the film prevents liquid, e.g., the condensation, from reaching the starch panel, thus enabling the starch panel to be usable as a thermal insulator in the container.

To fabricate a pad 30, the starch panel can be placed between two sheets of the water-proof film. The edges of the water-proof film can be heat-sealed to each other, e.g., along the entire perimeter of the panel, thus enclosing and sealing the panel in a pocket of the compostable water-proof film that has only slightly larger dimension than the panel itself. A suitable sealing temperature is above 100° C. Excess film outside the heat seal can be cut away.

In the directions parallel to the primary surface of the panels, the pocket can be up to about 0.5 inches larger on each side than the panel.

Alternatively, the film can be provided in a tubular form. To fabricate a pad 30, the panel is slid inside the tube of water-proof film, and the two open ends of the tube are heat sealed. This forms a pocket in which the panel sits.

In some implementations, the panel sits loose inside the pocket formed by the film. That is, the panel is not bonded or otherwise fixed to the film. Thus, the panel can slide inside the pocket relative to the film. For example, the film can be in sliding contact with the panel. The interior of the pocket can include a small amount of air. In some implementations, the air is vacuumed out before the pocket is sealed.

In some implementations, the panel is affixed to the film. For example, the film can be secured to the panel by heat bonding the film to the panel. As another example, the film can be secured to the panel by an adhesive. The adhesive can be a separate additive, or the adhesive can be provided by applying water to the panel to cause the starch in a portion of the panel at the surface to become tacky such that the film sticks to the panel.

The film can be affixed on both the interior and exterior surface of the panel, or on just one surface of the panel, e.g., just the interior surface or just the exterior surface of the panel. In addition, for each of the interior and exterior surface of the panel, the film can be affixed across the entire surface, or on just a portion of the surface, e.g., a perimeter portion along the edge or a central portion that is spaced away from the edge of the panel.

Other than one or more panels, there need not be any other thermally insulating material within the water-proof film. For example, unless one of the panels fractures due to applied stress, there are no loose pellets or pieces of other insulating material in the volume enclosed by the film. In some implementations, the pad 30 consists of, i.e., includes only, one or more panels, the water-proof film, and optionally some air inside the volume enclosed by the film.

Where both the panel and water-proof film are compostable, the entire pad can be disposed of as a unit in a composting bin. Where the panel is compostable and water-proof film are is recyclable, the film can be ripped off the panel manually by the recipient of the package, and then the panel can be disposed of in a composting bin and the film can be disposed of a recycling bin.

In the implementation shown in FIG. 1, the thermally insulating pads 30 include a bottom pad 32, a collar 34, and a top pad 36.

The bottom pad 32 has a length and width that match the bottom of the box 20, or are slightly smaller, e.g., by about an ⅛ inch tolerance, so that bottom pad 32 fits snugly at the bottom of the cavity 22 on the bottom of the box 20.

The collar 34 includes a single panel that is folded into four wall members 40. Each wall member 40 has a height (in the vertical direction) about equal to the height of the box 20, less the combined thickness of the top pad 32 and bottom pad 36. Each wall member 40 has a width (in the lateral direction) that matches the adjacent side wall 24 of the box 20, or is slightly smaller, e.g., e.g., by about an ⅛ inch tolerance. Thus, the collar 34 fits snugly into cavity 22 on top of the bottom pad 32, with each wall member 40 adjacent, e.g., in contact with, one of the side walls 24.

The top pad 36 has a length and width that match the top of the box 20, or are slightly smaller, e.g., e.g., by about an ⅛ inch tolerance, so that the perimeter of the top pad 36 can sits on the wall members 40 of the collar 34 and the top pad 36 itself fits snugly at the cavity 22. When the top of the box 20 is closed, e.g., by closing the flaps 26 or placing a lid, the top pad 36 sits adjacent, e.g., in contact with, the top of the box 20.

In some implementations, the surfaces of the pads 30 are basically flat up to and including their edges. "Basically flat" is used to indicate flat at the scale of the thickness of the pad, but still encompasses the possibility of small scale surface texturing. Thus, the lower rim of the collar 34 simply sits basically flat on the perimeter of the top surface of the bottom pad 32, and the perimeter of the top pad 36 simply sits basically flat on the upper rim of the collar 34. Alternatively, the interior surfaces of each pad, i.e., the surface of the pad facing the cavity and further from the box 20, can be beveled at the edge that is adjacent another pad. Thus, the beveled lower rim of the collar 34 sits on the beveled perimeter of the bottom pad 32, and the beveled perimeter of the top pad 36 sits of the beveled upper rim of the collar 34. In this latter case, the outer surface of each wall member 40 can have a height about equal to the height of the box 20.

FIGS. 2A-2G illustrate an example of construction of the pads 30 of the insulating shipping container 10 shown in FIG. 1.

Referring to FIG. 2A, an exploded perspective view, the collar 34 can be fabricated by forming a solid compostable panel 50 that has a length L approximately equal to or slightly less than the length of the lateral perimeter of the box 20, and a width W approximately equal or slightly less than the height of the box 20. The panel 50 is then placed between two sheets 60 of the compostable water-proof film. Referring to FIG. 2B, a cross-sectional side view, the two sheets 60 are heat sealed along a path than extends around the entire perimeter of the panel 50. The seal can be positioned no more than about 1 inch, e.g., no more than about ½ inch, from the edge of the panel 50. Excess film outside the heat seal can be cut away.

FIG. 2C is a cross-sectional side view, and FIG. 2D is a perspective view. Referring to FIGS. 2C and 2D, before or after sealing the panel 50 between the sheets 60, one surface of the panel 50 (which will be the inward facing surface of the panel) can be scored in three locations to divide the panel 50 into four rectangular plates 52, which correspond to the four side walls of the collar 34. The length of each plate 52 corresponds to the width of the corresponding side wall 50 of the collar 34. Scoring can be performed by compression with an angled rigid body.

Each score can create a recess 56 that extends across the width W of the panel. The recess 56 extends partially, but not entirely through the thickness of the panel 50. For example, the recess 56 can extend through about 50-75% of the thickness of the panel 50. The scoring can be angled, so the recess has a triangular cross-section.

The reduced thickness of the panel 50 in the scored areas increases the flexibility of the panel so that the panel 50 can be bent at a right angle without breaking. In particular, the panel 50 can be folded inwardly (with the inside surface being the side with the recess 56). This permits the panel 50 to remain as a single unitary part when the collar 34 is folded and placed in the box 20, which can improve thermal insulation by reducing creation of gaps in the insulating material.

FIG. 2E is a schematic exploded perspective view. FIG. 2F is a schematic cross-sectional side view. FIG. 2G is a schematic perspective view. Referring to FIGS. 2E-2G, construction of the top pad 32 and bottom pad 36 is even simpler. A panel 50 is formed having lateral dimensions approximately equal to or slightly less than the corresponding dimensions of the top or bottom the box 20. This panel 50 is then placed between two sheets 60 of the compostable water-proof film (see FIG. 2E), and the two sheets 60 are heat sealed along a path than extends around the entire perimeter of the panel 50 (see FIG. 2F) to provide the top pad 32 or bottom pad 36. Excess film outside the heat seal can be cut away.

FIGS. 3A-3I illustrate another example of construction of the pads 30 for the insulating shipping container 10. In the example of FIGS. 3A-3I, rather than three pads, the thermally insulating pads 30 include a first three-sectioned pad 70 and a second three-sectioned pad 72.

FIGS. 3A and 3B are schematic exploded perspective views of the two three-sectioned pads. FIGS. 3C-3F are schematic cross-sectional side view of the two three-sectioned pads. FIGS. 3G and 3H are schematic perspective views of the two three-sectioned pads. FIG. 3I is a schematic exploded perspective view showing how the two three-sectioned pads are positioned relative to each other.

These pads 30 are constructed similarly to the pads discussed above for FIGS. 2A-2D, with each pad 70, 72 formed by sealing a solid compostable panel within a compostable water-proof film. In particular, each three-sectioned pad 70, 72 is constructed in a manner similar to the collar 34 discussed above, but with scoring in two locations rather than three locations.

In particular, referring to FIG. 3A, the first three-sectioned pad 70 can be fabricated by forming a solid compostable panel 50 that has a length L approximately equal to or slightly less than the length of three side walls of the box 20, and a width W approximately equal or slightly less than the height of the box 20. Referring to FIG. 3B, the second three-sectioned pad 70 can be fabricated by forming a solid compostable panel 50 that has a length L approximately equal to or slightly less than the length of top and bottom of the box 20 plus the height of one of the side walls of the box, and a width W approximately equal or slightly less than the lateral length of one of the side walls of the box 20.

Referring to FIGS. 3A-3D, each panel 50 is then placed between two sheets 60 of the compostable water-proof film, and the two sheets 60 are heat sealed, as discussed above.

Referring to FIGS. 3E-3G, before or after sealing each panel 50 between the sheets 60, one surface of the panel 50 (which will be the inward facing surface of the panel) can be scored in two locations to divide the panel 50 into three rectangular plate 52, which correspond to the four side walls of the collar 34. The length of the plates 52 of the first three-section pad 70 correspond to the width of the three corresponding side walls of the box 20. The length of the plates 52 of the second three-section pad 72 correspond to the width of the top side, the length of the remaining side wall, and the width of the bottom side, respectively, of the box 20.

Together, the resulting two three-sectioned pads 70, 72 cover each of the six sides of the box 20 when inserted in the interior 22 of the box 20.

It should be realized that other configurations are possible for the two three-sectioned pads 70, 72. For example, the first three-sectioned pad could cover the bottom and two opposing sides of the box, and the second three-sectioned pad could cover the top and the other two opposing sides of the box.

FIGS. 4A-4D illustrate yet another example of construction of the pads 30 for the insulating shipping container 10. In the example of FIGS. 4A-3D, rather than three pads, the thermally insulating pads 30 include six pads 80, one for each of the six sides of the box 20.

FIG. 4A is a schematic exploded view of one of the pads. FIG. 4B is a schematic cross-sectional side view of one of the pads. FIG. 4C is a schematic perspective view of one of the pads. FIG. 4D is a schematic exploded perspective view showing how the two three-sectioned pads are positioned relative to each other.

These pads 30 are constructed similarly to the pads discussed above for FIGS. 2E-2G, with each pad formed by sealing a solid compostable panel within a compostable water-proof film. Each pad (and each panel of the pad) has a length and width appropriate for the dimensions of the associated side of the box 20, along the lines discussed above.

The example of FIGS. 4A-4D does not require scoring, and consequently can be easier to manufacture. However, the increased number of gaps could decrease the effectiveness of the thermal insulation.

FIGS. 5A-5H illustrate still another example of construction of the pads 30 for the insulating shipping container 10. In the example of FIGS. 5A-5H, rather than three pads, the thermally insulating pads 30 include a three-sectioned pads 90, and three individual pads 92.

FIG. 5A is a schematic exploded perspective view of the three-sectioned pad. FIGS. 5B and 5C are schematic cross-sectional side views of the three-sectioned pad. FIG. 3C is a schematic perspective view of the two three-sectioned pad. FIG. 5E is a schematic exploded view of one of the individual pads. FIG. 5F is a schematic cross-sectional side view of one of the individual pads. FIG. 5G is a schematic perspective view of one of the individual pads. FIG. 6H is a schematic exploded perspective view showing how the two three-sectioned pads are positioned relative to each other.

Referring to FIGS. 5A-5D, the three-sectioned pad 90 is constructed similarly to the three-sectioned pads discussed above for FIGS. 3A-3F, with the pad 90 formed by sealing a solid compostable panel within a compostable water-proof film. Referring to FIG. 5A, the three-sectioned pad 90 can be fabricated by forming a solid compostable panel 50 that has a length L approximately equal to or slightly less than the height of two side walls of the box 20 plus the length of the bottom of the box 20, and a width W approximately equal or slightly less than the width of one of the sides of the box 20.

Referring to FIGS. 5E-5G, the three individual pads 92 are constructed similarly to the top and bottom pads 32, 36 discussed above for FIGS. 2E-2G, with the pads 92 formed by sealing a solid compostable panel within a compostable water-proof film. Each pad 92 (and each panel of the pad) has a length and width appropriate for the dimensions of the side of the box 20 which it will line, as generally discussed above.

Although FIGS. 5A-5C show the three-sectioned pad having a center section that corresponds to the bottom of the box, this is not necessary. The center section could correspond to one of the side walls or the top of the box.

Even further configurations are possible for the pads 30, provided each wall of the box is provided with an individual pad or a section of a pad. For example, there could be three two-sectioned pads, or a three-sectioned pad, two-sectioned pad and an individual pad.

Moreover, there could be just a single pad 100 that fits inside the box 20 and covers all six sides of the box 20. For example, FIG. 6, which is a schematic top view of a pad 100 in an unfolded configuration, illustrates a single six-sectioned pad. To fabricate this six-sectioned pad 100, the panel can be formed in a "cross-shape", or another shape that when folded will correspond to the sides of the rectangular prism of the box 20. The panel is sandwiched between two sheets, as discussed above, and the edges are sealed along a path that runs close to the perimeter of the panel. Excess material of the sheets can be cut off. The panel can be scored with cuts 56 in five locations to divide the panel into six sections. The scoring corresponds to the positions necessary for the panel to be folded such that each section corresponds to one of the sides of the box 20. Although the implementation shown in FIG. 6 is for a cubical box, this is not required.

Figure 6:
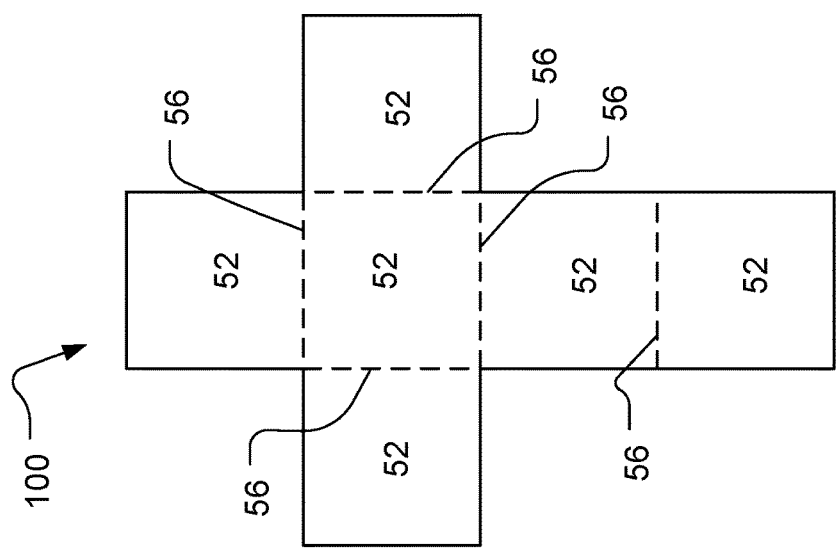
FIG. 6 illustrates an example that includes a single six-sectioned pad.

The example of FIG. 6 may provide improved good thermal insulation due to fewer gaps, and there can be a convenience for the customer to have just a single pad for each box. On the other hand, this configuration may have a cumbersome form factor.

The box 20 and pad or pads 30 that form the insulated shipping container 10 can be provided as an unassembled kit, and be assembled by a customer. For example, the box 20 and pads 30 could be shrink-wrapped or otherwise sealed together in packaging.

In any of the various examples discussed above, one or more apertures, e.g., about ⅛ to 5 inches across, can be formed through the film 60 on the side of the pad 30 closer to the box 20, that is the side opposite the opposite the cavity in which the item to be shipped is to be positioned. These apertures are not present on the side facing the cavity in which the item to be shipped is to be positioned; the film 60 on that side of the pad 30 is unbroken. The apertures can prevent pocket from acting like a balloon when the pad is inserted into the box—the film 60 can collapse against primary surfaces of the panels.

In some implementations, a pad includes only one panel in the pocket formed by the film. However, referring to FIGS. 7A and 7B, cross-sectional side views, in some implementations, the pad 30 includes multiple panels 50. The panels 50 are stacked along their thickness direction, and not arranged side-by-side. This permits fabrication of a thicker pad 30, thus increasing the thermal insulating capability. For example, this permits the total thickness of the pad to be about 1-4 inches. In addition, avoiding gaps between that would occur with side-by-side panels can improve thermal insulation. In the example shown in FIG. 7A, there are three panels 50a, 50b and 50c, but there could be just two panels or four or more panels.

Figure 7A:
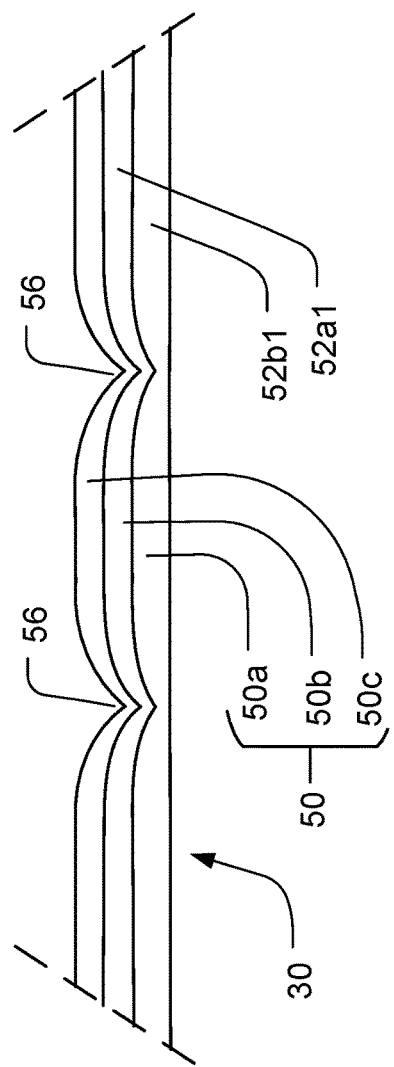
FIGS. 7A and 7B illustrates an example of multiple multi-section panels enclosed in a water-proof film, in an unfolded and folded state, respectively.
Figure 7B:
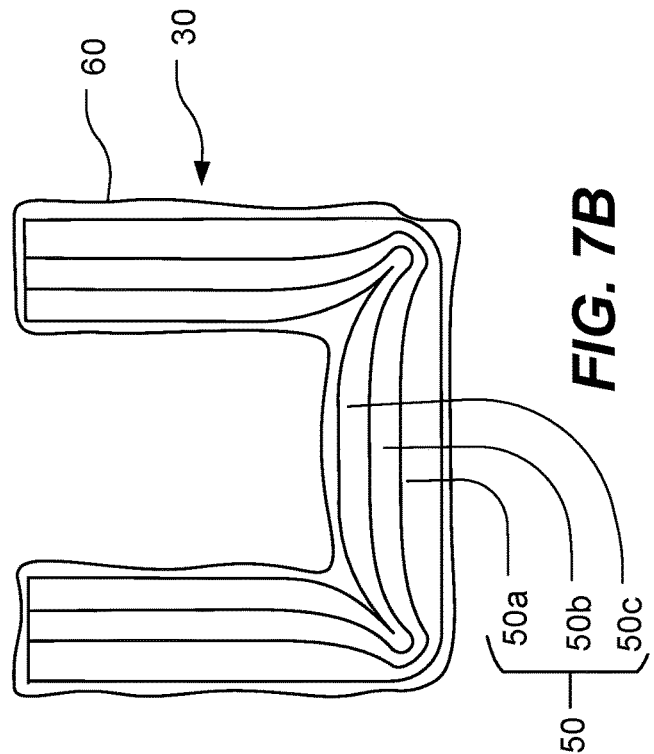

For a multi-section panel, when the panels 50 are scored, the scoring 56 can be performed by compressing the stack of panels along a line (rather than cutting the panels). As a result, in the scored region some of the panels can be driven partially into the underlying panel.

Where the panels 50 are multi-section panels, sections at each end of the pad can be shorter than the section immediately underneath to compensate for the stacking arrangement such that the ends of panels are substantially aligned. For example, as shown in FIG. 7A, section 52b1 is shorter than the underlying section 52a1. In addition, the ends of the sections at the end of each pad can be cut at an angle. For example, as shown in FIG. 7A, the ends of sections 52a1 and 52b1 can be cut at an angle, e.g., a 45° angle. Thus, as shown in FIG. 7B, when the multi-section panels are folded inwardly, e.g., to form the U-shaped pad, the ends of the panels 50 align.

In the various implementations discussed above, the individual pads 30 will rest on one another when inserted in the cavity of the box 20. However, the pads 30 are not fixed to each other, e.g., the pads are not secured by adhesive or interlocking components to each other.

Figure 8:
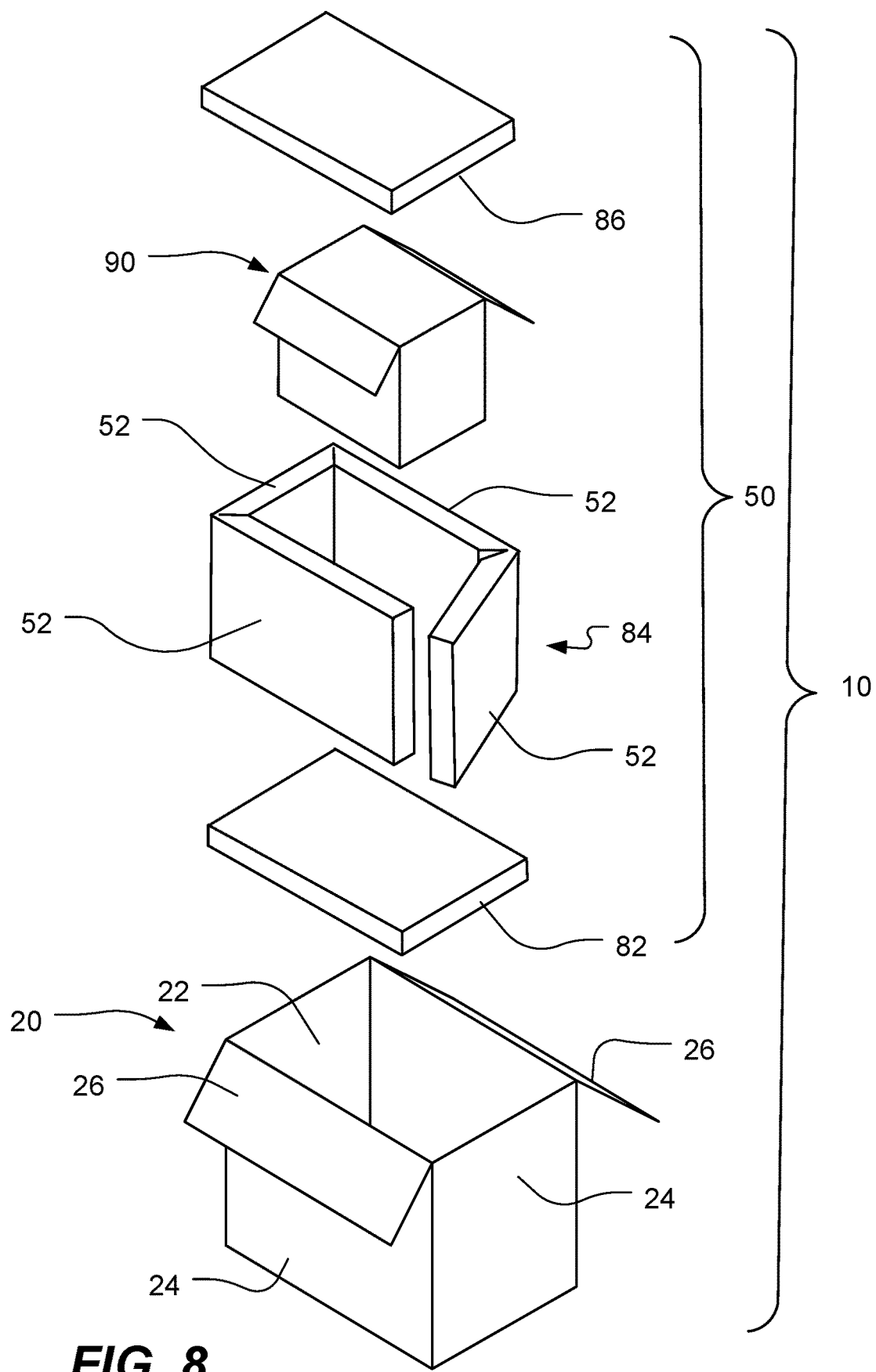
FIG. 8 illustrates an example of using solid compostable panels, without a water-proof film, for an insulated shipping container.

In some implementations, the solid compostable panels could be used, but without enclosing or coating the panels with a water-proof film. FIG. 8 is an exploded perspective view of an example of another implementation of an insulated shipping container 10. The shipping container 10 includes a recyclable box 20 and multiple thermally insulating compostable panels 50 that fit inside the interior cavity 22 of the box 20. The panels 50 are shaped such that when positioned in the box 20 they provide an interior space to receive the item and optionally a coolant, e.g., ice, dry ice or a gel pack.

Optionally, a recyclable interior box 90, e.g., a cardboard box, can fit into a space defined by the interior of the panels 50. In this case, the interior cavity of the interior box 90 provides the space to receive the item and optionally a coolant. The interior box 90 can provide additional thermal insulation, and can protect the panels from water, e.g., condensation caused by coolant. However, as noted above, the item and coolant could be placed into the interior space, without using the interior box.

Each panel 50 can be fabricated as discussed above, e.g., formed primarily of extruded milled sorghum, so as to be compostable. However, the panels are not coated with, enclosed in, or otherwise protected by a water-proof film. Rather, the panels 50 are simply inserted into the cavity 22 in the box. One or more of the panels 50 can be a multi-section panel, which is scored as discussed in the various implementations discussed above, and then folded at right angle to provide multiple rectangular plates.

In the implementation shown in FIG. 1, the thermally insulating panels 50 include a bottom panel 82, a collar 84, and a top pad 86.

The bottom panel 82 has a length and width that match the bottom of the box 20, or are slightly smaller, e.g., by about an ⅛ inch tolerance, so that bottom panel 82 fits snugly at the bottom of the cavity 22 on the bottom of the box 20.

The collar 84 includes a single panel that is folded into four rectangular plates. The four rectangular plates provide four wall members 40, which are equivalent to the wall members discussed with respect to FIG. 1, but without the water-proof film. Each wall member 40 has a height (in the vertical direction) about equal to the height of the box 20, less the combined thickness of the top panel 82 and bottom panel 86. Each wall member 40 has a width (in the lateral direction) that matches the adjacent side wall 24 of the box 20, or is slightly smaller, e.g., e.g., by about an ⅛ inch tolerance. Thus, the collar 84 fits snugly into cavity 22 on top of the bottom panel 82, with each wall member 40 adjacent, e.g., in contact with, one of the side walls 24.

The top panel 86 has a length and width that match the top of the box 20, or are slightly smaller, e.g., e.g., by about an ⅛ inch tolerance, so that the perimeter of the top panel 86 can sit on the wall members 40 of the collar 84 and the top panel 86 itself fits snugly at the top of the cavity 22.

Although FIG. 8 illustrates a configuration for the panels 50 that is similar to the configuration of pads 30 in FIGS. 1 and 2A-2G, other configurations for the panels, e.g., equivalent to those shown in FIGS. 3A-3I, FIGS. 4A-4D, FIG. 5A-5H, or 6, are possible. Similarly, multiple panels 50 can be stacked, e.g., as illustrated in FIGS. 7A-7B, but again without the water-proof film.

Although milled sorghum is discussed above, as noted it may be possible to form the panel out of a grain starch, such as corn starch or wheat starch. However, sorghum is generally superior in that it can provide superior thermal insulation than corn starch. In addition, the particulates of milled sorghum may be more amenable to extrusion.

Figure 9:
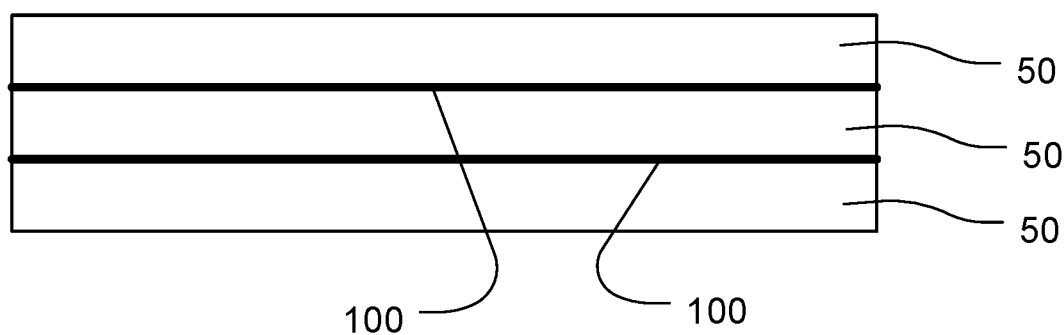
FIG. 9 illustrates multiple panels that are laminated together.

Referring to FIG. 9, although in some implementations multiple panels can be stacked without being joined, it is also possible for multiple panels 50 to be stacked and laminated together. This can increase the total thickness of the resulting panel, e.g., to 1 to 3 inches thick. The stacked panels can be joined by a thin layer of compostable adhesive 100.

It should be understood that although various terms such as "top", "bottom", "vertical" and "lateral" are used, these terms indicate relative positioning of components under the assumption that an opening to the box 20 is at the top, and don't necessarily indicate an orientation relative to gravity; in use, or even during assembly, the container 10 could be on its side or upside down relative to gravity. The term "slightly" indicates no more than about 5%, e.g., no more than 2%.

A number of embodiments have been described. Nevertheless, it will be understood that various modifications may be made without departing from the spirit and scope of the invention. Accordingly, other embodiments are within the scope of the following claims.

What is claimed is:
1. A thermal insulation article for placement in a shipping container to hold an item, comprising:
   a thermally insulating pad shaped to be positioned in a cavity of a rectangular prism shipping container to be adjacent to and cover one or more of a floor, four side walls and cover of the container while leaving an interior space to receive the item, wherein the thermally insulating pad includes a compostable panel that holds together as a single unit and is formed primarily of starch, the panel providing a rectangular plate dimensioned to substantially span whichever of the floor, plurality of side walls or cover that the rectangular plate is adjacent, and a compostable or recyclable water-proof polymer film forming a pocket and surrounding the panel with the panel slidable within the pocket.

2. The article of claim 1, wherein a surface of the compostable panel has bumps.

3. The article of claim 2, wherein the surface of the compostable panel is corrugated.

4. The article of claim 1, wherein the water-proof polymer film is heat sealed along opposing edges of the panel.

5. The article of claim 1, wherein the compostable panel has a thickness between about ¼ and 1 inch.

6. The article of claim 1, wherein the compostable panel has a density of about 0.6 to 3.5 g/cm$^3$.

7. The article of claim 1, wherein the starch comprises a grain starch, a root starch, a vegetable starch, or combinations thereof.

8. The article of claim 7, wherein the starch comprises corn starch, wheat starch or milled sorghum.

9. A thermal insulation article for placement in a shipping container to hold an item, comprising:

a thermally insulating pad shaped to be positioned in a cavity of a rectangular prism shipping container to be adjacent to and cover one or more of a floor, four side walls and cover of the container while leaving an interior space to receive the item, wherein the thermally insulating pad includes a compostable panel that holds together as a single unit and is formed primarily of starch, the panel providing a rectangular plate dimensioned to substantially span whichever of the floor, plurality of side walls or cover that the rectangular plate is adjacent, and a compostable or recyclable water-proof polymer film forming a pocket and surrounding the panel with an interior of the pocket evacuated of air but without the film being bonded to the panel.

10. The article of claim 9, wherein a surface of the compostable panel has bumps.

11. The article of claim 10, wherein the surface of the compostable panel is corrugated.

12. The article of claim 9, wherein the water-proof polymer film is heat sealed along opposing edges of the panel.

13. The article of claim 9, wherein the compostable panel has a thickness between about ¼ and 1 inch.

14. The article of claim 9, wherein the compostable panel has a density of about 0.6 to 3.5 g/cm$^3$.

15. The article of claim 9, wherein the starch comprises a grain starch, a root starch, a vegetable starch, or combinations thereof.

16. The article of claim 1, wherein the starch comprises corn starch, wheat starch or milled sorghum.

\* \* \* \* \*